(12) United States Patent
Harpenau

(10) Patent No.: US 7,731,045 B2
(45) Date of Patent: Jun. 8, 2010

(54) WALL OUTLET BOX FOR A DRYER VENT EXHAUST CONDUIT WITH PIPE SUPPORT TAB

(76) Inventor: Richard J. Harpenau, 6190 Sand Pine Ct., Jupiter, FL (US) 33458

( * ) Notice: Subject to any disclaimer, the term of this patent is extended or adjusted under 35 U.S.C. 154(b) by 696 days.

(21) Appl. No.: 11/550,568

(22) Filed: Oct. 18, 2006

(65) Prior Publication Data

US 2008/0093359 A1   Apr. 24, 2008

(51) Int. Cl.
  *H02G 3/08*  (2006.01)
  *H01H 9/02*  (2006.01)
(52) U.S. Cl. .............................. 220/3.2; 220/3.7; 174/58
(58) Field of Classification Search .................. 220/3.2, 220/3.3, 3.7; 174/58, 59, 64
  See application file for complete search history.

(56) References Cited

U.S. PATENT DOCUMENTS 5,476,183 A   12/1995   Harpenau 6,419,102 B1 *   7/2002   Harpenau ................. 220/3.3
6,765,146 B1 *   7/2004   Gerardo ..................... 174/58

\* cited by examiner

*Primary Examiner*—Anthony Stashick
*Assistant Examiner*—Shawn M Braden
(74) *Attorney, Agent, or Firm*—Akerman Senterfitt

(57) ABSTRACT

A wall outlet box having a plurality of walls defining an enclosure open at the front thereof is provided. The enclosure can include a back, opposing sides, a top, and a bottom. Forward facing edges of the enclosure can define a front periphery with a mounting lip extending therefrom for mounting the outlet box into a wall. At least one port is provided to engage with a dryer exhaust conduit and at least one measurement member extends from an edge of the port. The at least one measurement member can extend to at least a length approximately equal to a length of the protruding exhaust conduit sufficient to securely attach a flexible hose thereto, such that the exhaust conduit may be placed against the measurement member as a template prior to installation and cutting of the exhaust conduit and the outlet box.

14 Claims, 10 Drawing Sheets

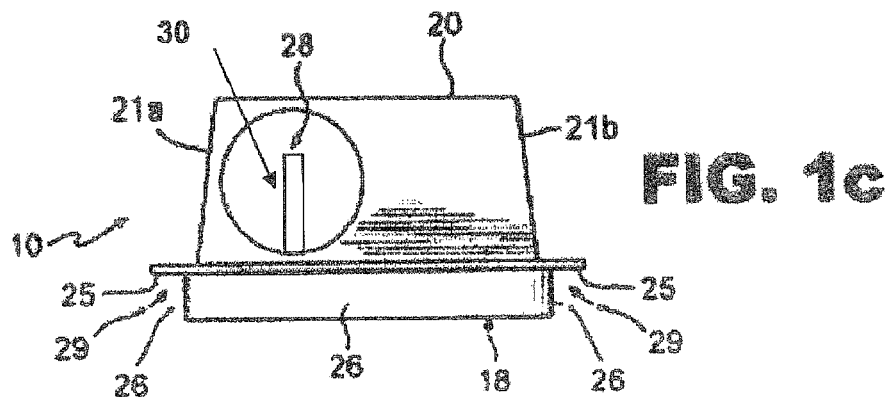
FIG. 1c
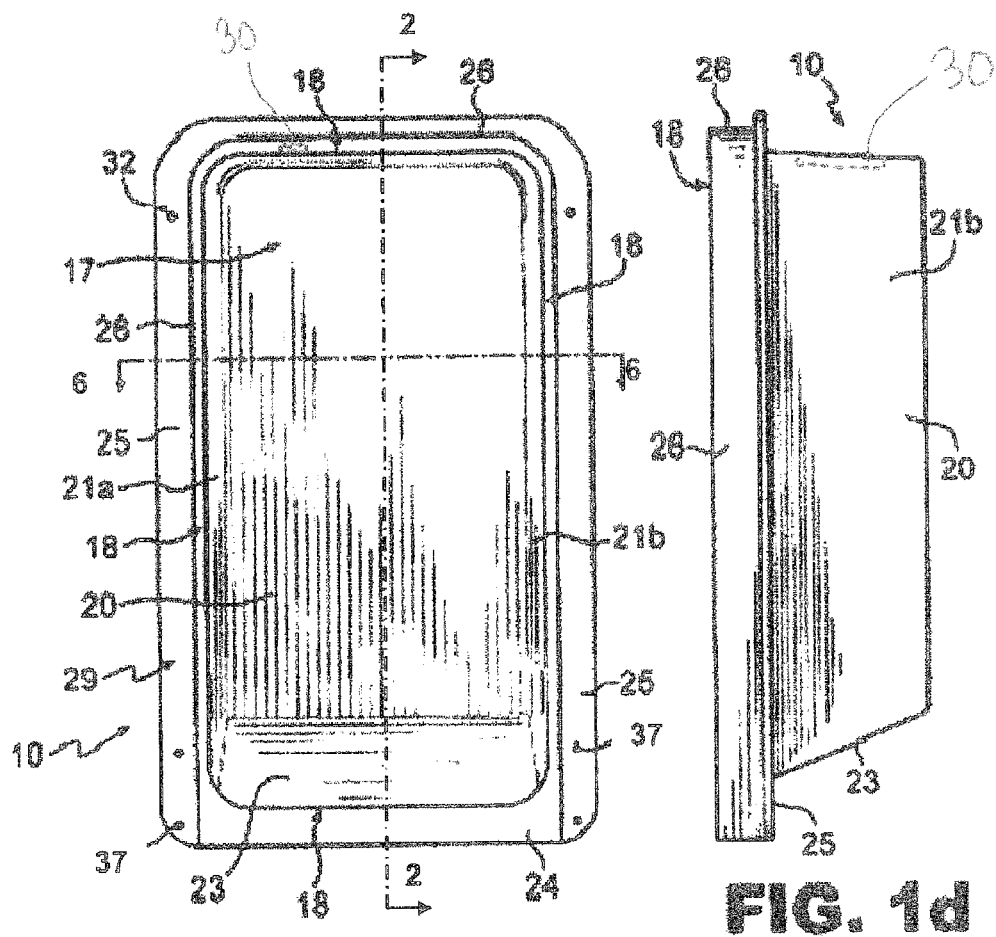
FIG. 1b
FIG. 1d

WALL OUTLET BOX FOR A DRYER VENT EXHAUST CONDUIT WITH PIPE SUPPORT TAB

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

The present invention relates to clothes dryer exhaust vent systems, and more particularly to a wall outlet box for a dryer vent exhaust conduit.

2. Description of the Related Art

A clothes dryer requires an exhaust conduit, typically enclosed in a wall cavity, which conveys heated air and lint from the dryer to an external location. Generally, a flexible hose is used to connect the dryer blower to the exhaust conduit. However, if the flexible hose is kinked or crushed, or otherwise altered or damaged, air flow from the dryer can be restricted, resulting in inefficient operation of the dryer. Of even greater concern is the possibility of lint buildup within an altered or damaged hose. Lint material is combustible, and the heat build-up due to blocked air flow can result in fire. In this regard, the U.S. Consumer Product Safety Commissioner estimates that there are 15,500 occurrences of dryer fires annually, many of which are the result of lint trapped in the exhaust duct.

In a common installation configuration, the exhaust conduit within the wall cavity is angled so that it protrudes perpendicularly from the wall surface, and the flexible hose leading from the dryer blower is inserted therein. The diameter of the flexible hose is typically sized to allow for close engagement with the exhaust conduit.

The positioning of the exhaust conduit in the wall usually causes the flexible hose to bend in at least two places when connected because it often does not align properly with the exhaust on the clothes dryer itself. During installation, this connection is initially made and the dryer is then pushed toward the wall. Dryers are usually installed in an area with a limited amount of space and it is extremely difficult to adjust the vent connection after the dryer is installed. To avoid damaging or altering the hose during installation, the dryer is often positioned a considerable distance from the wall containing the exhaust conduit.

The point of connection for the flexible hose usually consists only of the protruding metal conduit. Alternatives to this arrangement are seen in Harpenau, U.S. Pat. No. 5,476,183 and Harpenau, U.S. Pat. No. 6,410,102, which disclose a recessed substantially rectangular box or receptacle to be mounted in a wall which can receive the flexible hose, thereby allowing the dryer to be placed in close proximity to the wall. The box includes a plurality of apertures to receive the exhaust conduit so as to allow for different installation configurations. The box may also be configured to guide the flexible hose into the proper position during installation.

However, installation of such boxes can be problematic, as the installer may have difficulty in supporting a length of dryer exhaust conduit pipe while assembling additional lengths of dryer exhaust conduit. In cases where the rigid exhaust conduit protrudes too far into the wall outlet box, the wall outlet box may not provide sufficient height or space to facilitate the recoiling and storage of the flexible dryer hose. If too much length of dryer exhaust conduit protrudes from the port in the box, it can reduce the amount of recoil space available for the flexible hose and impede the proper connection of the flexible hose to the dryer exhaust conduit.

Additionally, when improper measurement of the length of dryer exhaust conduit needed is made, another possible result is excess length of dryer conduit protruding from the outlet box, resulting in waste of dryer conduit material and increased costs to the installer. Another possible result is that the dryer exhaust conduit fails to sufficiently protrude from the opening, resulting in improper installation of the dryer hose. This can result in increased risk of fire due to venting of dryer lint inside the wall rather than through the dryer exhaust conduit. Typically to get around such problems, the installer can make several detailed measurements to ensure a proper length. However such a task can be time-consuming and not economically efficient.

Therefore, what is needed is a wall outlet box that enables the installer to consistently and accurately determine and provide the proper length of protruding dryer exhaust conduit when installing a wall outlet box, without the need to make detailed measurements or the need to have a third person to support the dryer exhaust conduit from the right distance during installation.

SUMMARY OF THE INVENTION

The invention is directed to wall outlet boxes or receptacles for an exhaust conduit. A measurement member can be provided that assists an installer during the cutting and installation of the conduit into the outlet box through proper alignment. The measurement member can also be broken away after facilitating the installation.

In one exemplary embodiment, a wall outlet box is provided comprising a plurality of walls defining an enclosure open at a front thereof, with the enclosure including a back surface, a pair of opposing side surfaces, a top surface, and a bottom surface. The opposing side surfaces, the bottom surface and the top surface have forward facing edges defining a front periphery. A mounting lip extends outwardly from at least a portion of the front periphery for mounting the outlet box into a wall. At least one port in at least one of the opposing side surfaces, the back surface and/or the top surface engages with an exhaust conduit whereby a flexible hose can be securely attached to a protruding portion of the exhaust conduit. At least a portion of the flexible hose can be housed in the enclosure. At least one measurement member extends across a portion of the at least one port such that the exhaust conduit may be placed against the at least one measurement member as a template prior to installation and cutting of the exhaust conduit and the outlet box.

In another aspect, a kit for installing a dryer exhaust is provided comprising a wall outlet box having a plurality of walls defining an enclosure open at a front thereof wherein the plurality of walls have forward facing edges defining a front periphery; a mounting lip extending outwardly from at least a portion of the forward facing edges for mounting the outlet box into a wall; and at least one port in at least one of the plurality of walls to engage with an exhaust conduit, whereby a flexible hose attached to a dryer can be securely attached to a protruding portion of the exhaust conduit and at least a portion of the flexible hose can be housed in the enclosure. The kit further comprises a measurement member having a measurement portion and a conduit support portion arranged perpendicularly to the measurement portion, with the measurement member being attached to the at least one port, wherein a length of the measurement portion is approximately equal to a length of the exhaust conduit protruding into the wall outlet box that is sufficient to securely attach the flexible hose thereto, such that the exhaust conduit may be supported by the conduit support portion against the measurement portion as a template prior to installation and cutting of the exhaust conduit and the wall outlet box into a wall.

In another aspect, a method of installing a dryer conduit is provided comprising: providing a wall outlet box formed in one piece of a heat resistant material and having a mounting lip extending therefrom for mounting the wall outlet box into a wall; attaching the wall outlet box via the mounting lip to the wall using a plurality of fasteners; and rotating a measurement member of the wall outlet box in a downward direction towards a plane substantially perpendicular to a plane of at least one port in the wall outlet box, wherein the measurement member extends from an edge of the at least one port and has a first flexible portion proximal to the edge of the least one port, and wherein the first flexible portion allows rotation of the measurement member. The method further comprises rotating a conduit support portion of the measurement member in an upward direction towards a plane substantially parallel to the plane of the at least one port, wherein the conduit support portion is defined between a free end of the measurement member and a second flexible portion of the measurement member, wherein the second flexible portion allows rotation of the conduit support portion; and inserting a first end of the dryer conduit into the at least one port, and wherein a protruding conduit portion of the first end of the dryer conduit engages the conduit support member.

The at least one measurement member can extend from an edge of the at least one port to at least a length approximately equal to a length of the protruding portion of the exhaust conduit sufficient to securely attach the flexible hose thereto. The at least one measurement member can further comprise a first flexible portion, proximal to the edge of the at least one port, wherein the first flexible portion allows a free end of the at least one measurement member to rotate in a downward direction in a plane perpendicular to a plane of the at least one port. The at least one measurement member may further comprise a second flexible portion, wherein the second flexible portion and the free end of the at least one measurement member define a conduit support portion and wherein the first flexible portion and the second flexible portion define a measurement portion therebetween. The second flexible portion can allow the conduit support portion to rotate relative to the at least one measurement portion into a plane substantially parallel to the plane of the at least one port.

The at least one measurement member can further comprise a conduit support portion extending from the free end of the at least one measurement member, and the conduit support portion may extend in a direction substantially perpendicular to the at least one measurement member. The at least one measurement member can extend in a direction substantially perpendicular to a plane of the at least one port. The at least one measurement member can further comprise a flexible portion, wherein the flexible portion and a free end of the at least one measurement member may define a conduit support portion and the edge and the flexible portion can define a measurement portion, wherein the flexible portion allows the conduit support portion to flex relative to the measurement portion into a plane parallel to the plane of the at least one port. The at least one measurement member can further comprise a conduit support portion extending from the free end of the at least one measurement member, with the conduit support portion extending towards the at least one port in a direction substantially perpendicular to the at least one measurement member.

The mounting lip can be configured to allow the wall outlet box to be mounted to at least one vertical wall stud in a stud wall. The top surface, bottom surface, and opposing side surfaces can flare outwardly from the back surface to the front periphery. The bottom surface may be adapted to guide the flexible hose towards the exhaust conduit. The back surface and bottom surface can be curved such that at least a portion of the back surface and the bottom surface comprise a substantially continuous surface. The at least one measurement member may be frangibly removable from the at least one port. The wall outlet box can be constructed from heat resistant materials selected from the group consisting of metal alloys, fiberglass, ceramic materials, and plastic materials.

BRIEF DESCRIPTION OF THE DRAWINGS

There are shown in the drawings arrangements which are presently preferred, it being understood, however, that the invention is not limited to the precise arrangements and instrumentalities shown, wherein:

FIG. 1b is a front elevation view of the arrangement shown in FIG. 1a.

FIG. 1c is a top plan view of the arrangement shown in FIG. 1a.

FIG. 1d is a side elevation view of the arrangement shown in FIG. 1a.

FIG. 5 is a cross-sectional view of the arrangement shown in FIG. 3 in operation, taken along the line 5-5 in FIG. 3a.

DETAILED DESCRIPTION OF THE DRAWINGS

Figure 1A:
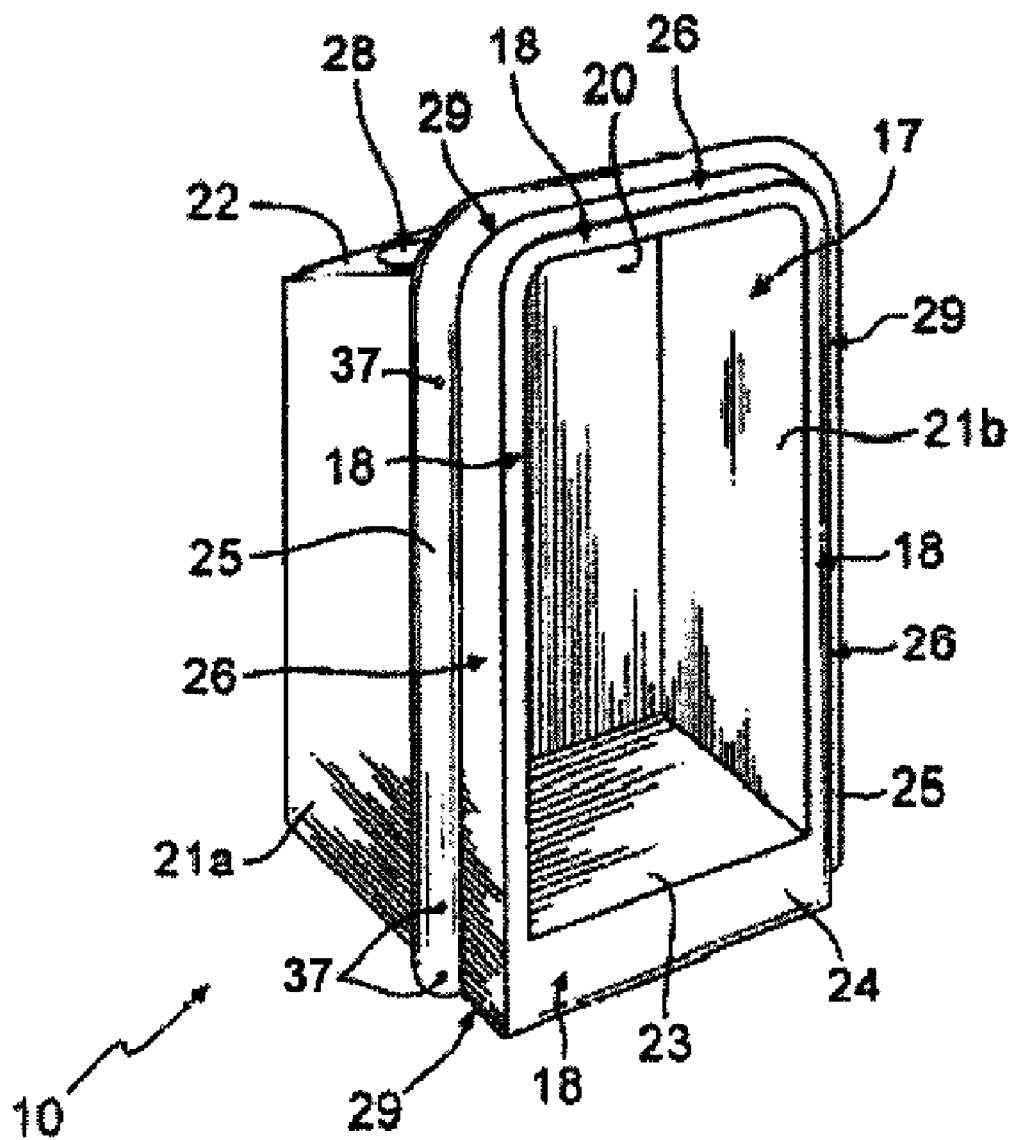
FIG. 1a is a perspective view of an arrangement of the invention.
Figures 2A, 2B:
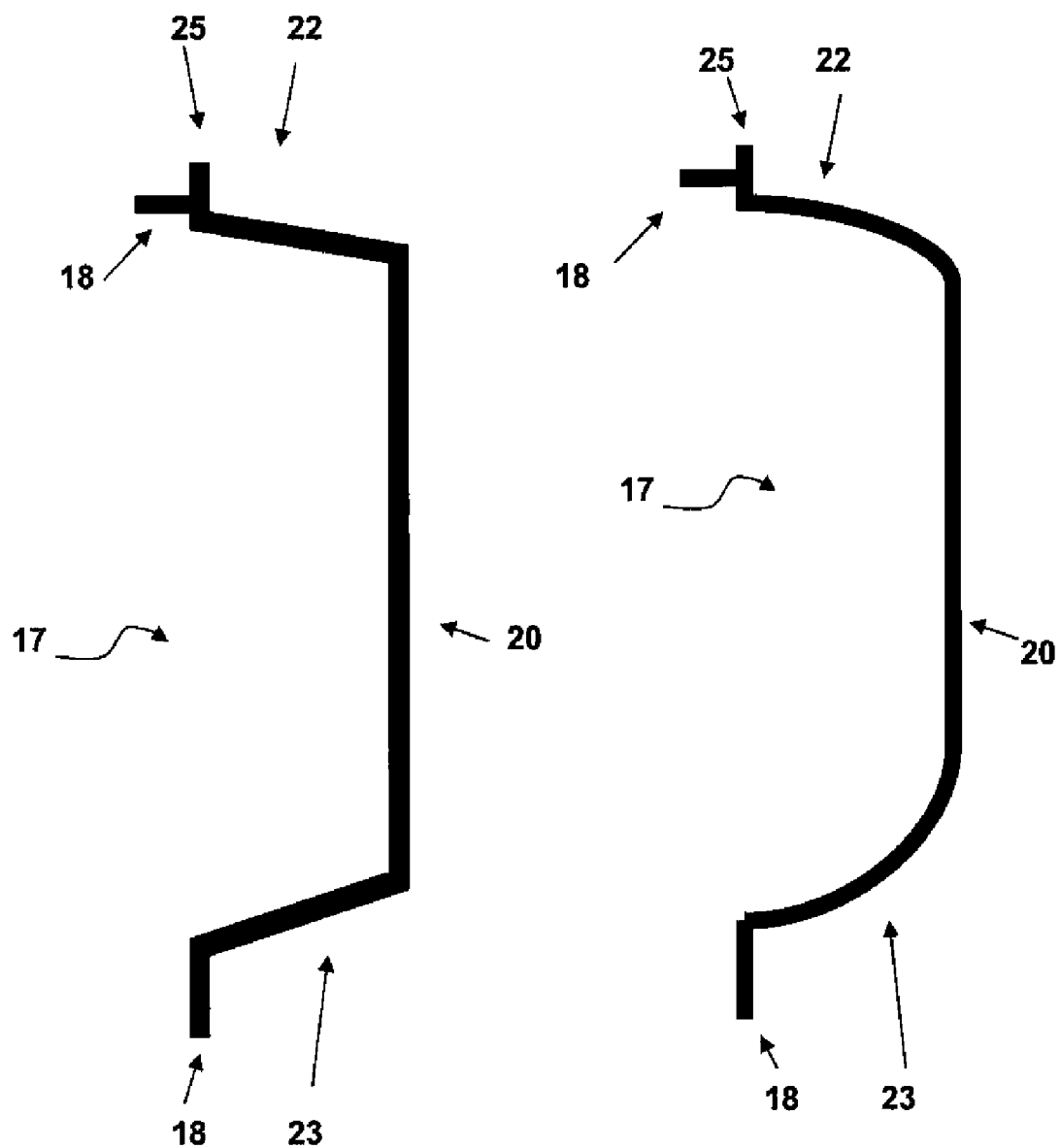
FIG. 2a is a cross-sectional view of an arrangement in accordance with the present invention taken along the line 2-2 in FIG. 1b.
FIG. 2b is a cross-sectional view of another arrangement in accordance with the present invention taken along the line 2-2 in FIG. 1b.

A wall outlet box or receptacle 10 for a dryer exhaust vent conduit according to an arrangement of the present invention is illustrated in FIGS. 1a-e. The wall outlet box 10 includes a plurality of substantially planar integral surfaces defining a pan-shaped enclosure 17. The enclosure 17 can include a back surface 20, a top surface 22, opposing side surfaces 21a and 21b, and an inclined lower surface 23. The forward facing edges of back surface 20, top surface 22, opposing left and right side surfaces 21a and 21b, and inclined lower surface 23 may located in the same plane and collectively define a front periphery 18. The front periphery 18 can have a perimeter greater than the perimeter of the back surface 20. In some arrangements, the surfaces of the enclosure 17 may intersect creating an discrete edge as shown in FIG. 2a. In other arrangements, the surfaces may intersect gradually, creating a curved edge as shown in FIG. 2b. The present disclosure also contemplates other shapes and configurations for the surfaces of the enclosure 17.

In an installed configuration (to be described hereinafter), the front periphery 18 and the back surface 20 may be aligned substantially parallel to a wall surface. The lower surface 23 may be adjacent to the back surface 20. In the various arrangements, the lower surface 23 may extend downwardly from the back surface 20 to the front periphery 18 at an angle to the plane of the back surface 20. Although the angle of the bottom surface 23 to the plane of the back surface 20 may comprise from any angle up to 90 degrees (where the bottom surface and the back surface are substantially perpendicular), for most arrangements an angle between 50 degrees and 75 degrees is sufficient, preferably 60 to 65 degrees.

An exhaust conduit would typically be located within a wall cavity proximate to the location where a clothes dryer would be installed. The enclosure 17 may include a port adapted to engage with an exhaust conduit. The port can be an aperture, a pipe, a flexible sleeve, a flange, or any suitable structure which can engage with the exhaust conduit and allow the connection of the flexible hose to the exhaust conduit.

The port can be located in any suitable portion of the wall outlet box, including the back surface 20, the top surface 22, the opposing side surfaces 21a and 21b, or inclined lower surface 23. In the illustrated arrangement, the port is an aperture 28 which extends through the top surface 22. Although a circular aperture 28 is illustrated, the aperture 28 may have any suitable configuration, including, but not limited to, an elliptical, triangular, or hexagonal configuration, as shown in the illustrated arrangements in FIGS. 3a and 3b.

As the exhaust conduit would typically be secured to a stud wall, the aperture 28 for the illustrated arrangements can be offset toward the left or right side of the top surface 22 so that it can be aligned with a vertically depending exhaust conduit. In order to allow other installment configurations, the aperture 28 can be located in the back surface 20, the top surface 22, the opposing side surfaces 21a and 21b, or the bottom surface 23.

Rather than having a single aperture 28, the wall outlet box 10 can include a plurality of apertures 28 to accommodate different installation configurations. The apertures 28 can be initially sealed with a knockout portion having frangible connector webs which can be ruptured to open the desired aperture 28.

The enclosure 17 may also include at least one measurement member 30 extending from at least one edge of the aperture 28. In the illustrated arrangement, a measurement member 30 extends from an edge of the aperture 28 adjacent to the front periphery 18 and in a direction substantially perpendicular to the front periphery 18, while remaining substantially parallel to the plane of the top surface 22. However, the measurement member 30 may be configured to extend in other directions which may be suitable, depending on the location and configuration of the aperture 28.

Figure 4A:
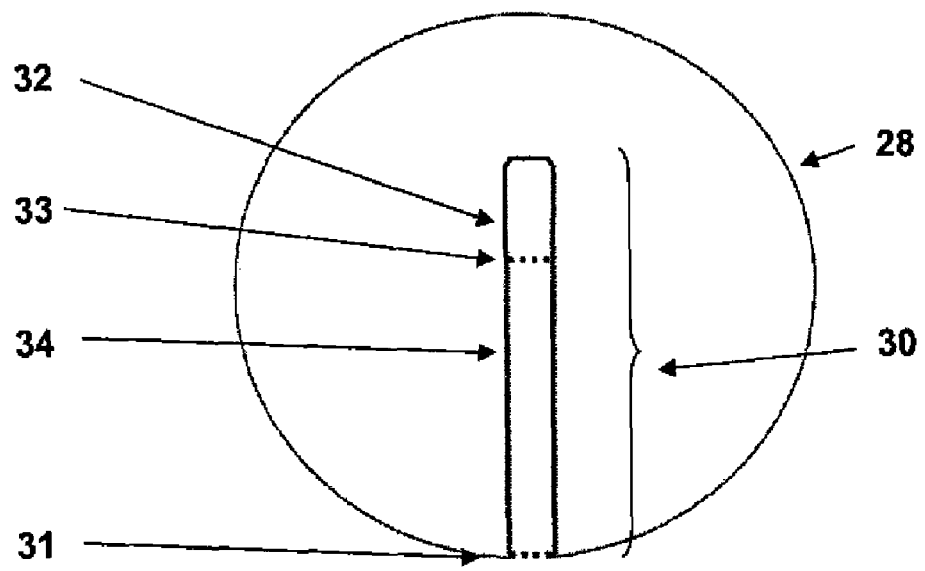
FIG. 4a is a close-up view of the aperture of the arrangement shown in FIGS. 1a-d with an exemplary measurement member for use with the arrangement shown in FIGS. 1a-d.

In the illustrated arrangement and as shown in FIG. 4a, the measurement member 30 is further comprised of a first flexible portion 31. In the illustrated arrangement, the first flexible portion 31, proximal to the aperture, is adapted to allow the measurement member 30 to flex at least through 90 degrees, preferably through 180 degrees. However, the first flexible portion may be configured to extend in other directions which may be suitable, depending on the location and configuration of the aperture 28 and the measurement member 30.

In this and other arrangements, the first flexible portion 31 can be further adapted to be a frangible portion of the measurement member 30 to allow for removal of the measurement member 30 by applying force or using a cutting tool.

Figure 4B:
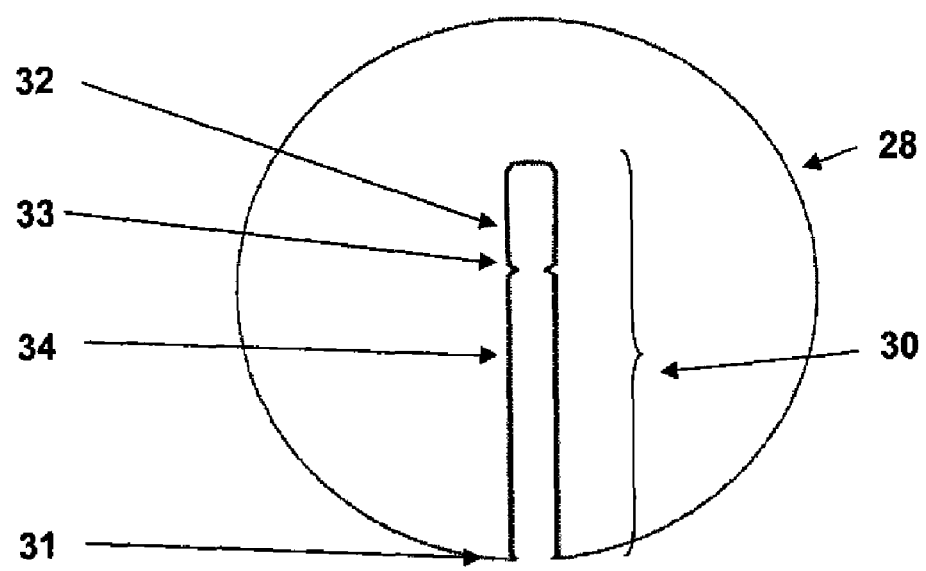
FIG. 4b is a close-up view of the aperture of the arrangement shown in FIGS. 1a-d with another exemplary measurement member for use with the arrangement shown in FIGS. 1a-d.
Figure 5:
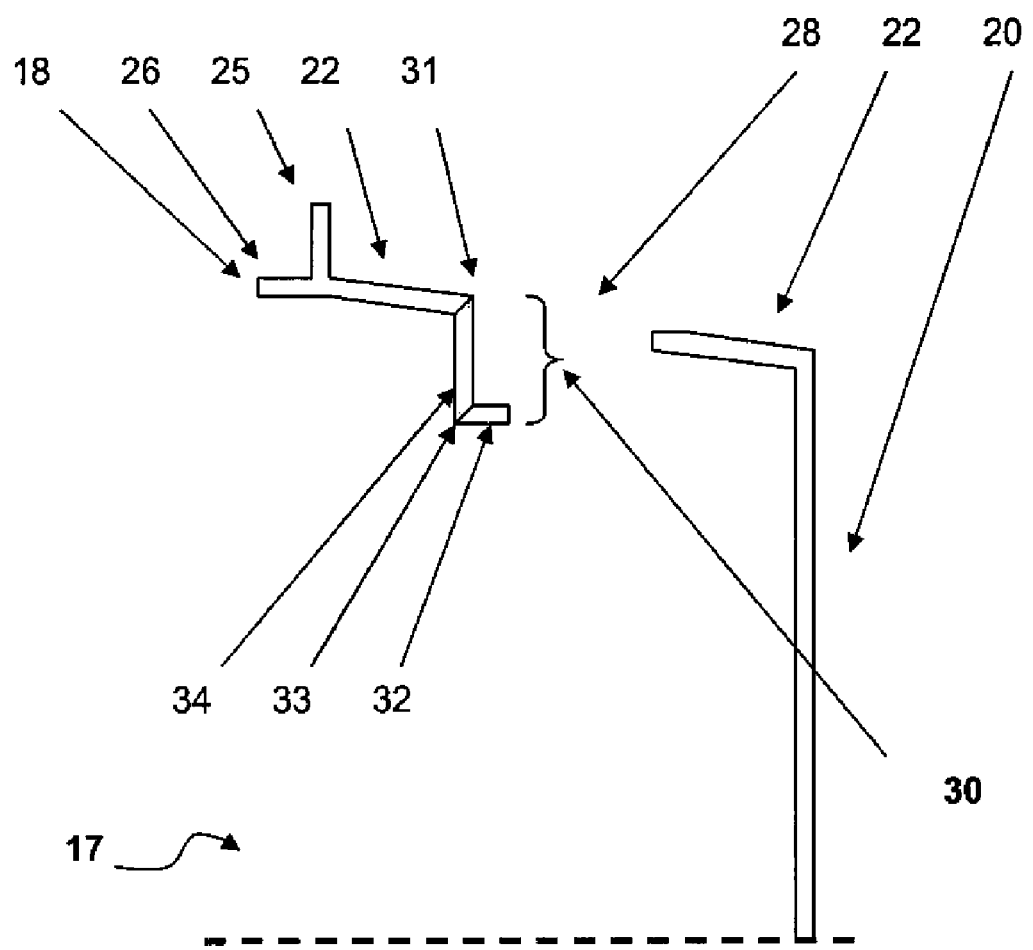

In this and other arrangements, the measurement member 30 may be further comprised of a conduit support portion 32, defined by the region between the free or distal end of the measurement member 30 and a second flexible portion 33. The first and second flexible portions 31 and 33 can be living hinges formed by regions of reduced width and/or thickness, such as, for example, as shown in FIG. 4b. The present disclosure contemplates forming first and second flexible portions 31 and 33 by other structures and/or techniques including use of a different material along the flexible portions that is more resilient than the rest of the measurement member 30. This arrangement provides a measurement portion 34, defined by the region of the measurement member 30 between the first flexible portion 31 and the second flexible portion 33. In such arrangements, the first flexible portion 31 and the second flexible portion 33 allow the measurement member 30 and the conduit support portion 32 to be adjusted to form an L-shaped member, as shown in FIG. 5. The measurement portion 34 and conduit portion 32 can be rotated or pivoted about the first and second flexible portions 31 and 33, respectively, to form the L-shaped member. In this and other arrangements, measurement member 30 is configured so that the length of the measurement portion 34 is approximately equal to the length of protruding dryer exhaust conduit preferred for attaching a dryer exhaust hose. Similarly, in arrangements without a conduit support portion 32, the measurement member 30 need only have a length approximately equal to the length of dryer exhaust conduit required to securely attach a dryer exhaust hose.

For operation of the illustrated arrangement, the measurement member 30 can be first rotated downward about the first flexible portion 31 until the measurement member 30 is approximately parallel to the direction of the dryer exhaust conduit to be inserted. Then the pipe support member 32 may be rotated back towards the aperture 28 to form an L-shaped piece, generally perpendicular to the direction of the dryer exhaust conduit to be inserted. Afterwards, a first end of the dryer exhaust conduit may be inserted downwardly into the enclosure 17 through the aperture 28 until the end of the dryer exhaust conduit protruding into the enclosure 17 rests upon the conduit support portion 32. During an installation in which the dryer exhaust conduit is built out from the wall outlet box 10, at this point in the installation, the installer may add or continue installing the dryer exhaust conduit to the termination point on the exterior of the building knowing that the conduit will be supported while he is completing the installation of the conduit. Alternatively, during an installation in which the dryer exhaust conduit is built to the wall outlet box 10, at this point in the installation, the installer may mark or trim the second end of the dryer exhaust and complete the installation of the conduit. Afterwards, the installer can remove the measurement member 30 using minimal physical force and the wall outlet box is ready to receive a dryer hose. Of course, the particular sequence described above can be adjusted to facilitate the formation of the L-shaped member 30 and the installation of the dryer exhaust conduit and the flexible dryer hose.

Such an arrangement is advantageous, since it allows the installer to use only an amount of dryer conduit sufficient to secure a flexible hose in place later, since by design, the measurement portion 34 is approximately equal to the amount of protruding conduit needed. In addition, an arrangement can be advantageous when using dryer exhaust conduit that is not fitted to the aperture and cannot therefore be held in place by frictional or tensional forces.

The illustrated arrangement may also be used as a measuring point for the installer. The installer can measure the approximate length of conduit needed by measuring from the measurement member 30 or the conduit support portion 32 to the next dryer exhaust conduit section. Armed with proper measurements, the install can proceed with removal of the measurement member 30, cutting of the proper length of dryer conduit, and completing the installation.

In arrangements without the conduit support portion 32, the measurement member and a second end of the dryer conduit may be secured in place first, as discussed above, and then the measurement member 30 can used to identify the excess protruding dryer conduit of the first end to be trimmed.

In other arrangements, the measurement member can further comprise a configuration in which a conduit support portion 32 can extend from the measurement member 30 without the need for flexible portions, resulting in the measurement member 30 comprising a fixed L-shaped piece to provide for conduit support portion 32 functionality as described above.

In other arrangements, the enclosure 17 may be constructed to have the measurement member 30 extend substantially perpendicular to the plane of the aperture 28 and thus extend in the direction of the dryer conduit to be installed. This eliminates the need to have first flexible portion 31. In such arrangements, the measurement member 30 may still be frangible to allow for removal after installation. In such arrangements, a conduit support portion 32 may still be defined by a second flexible portion 33, as described above. Additionally, in other arrangements, the enclosure 17 may also be configured with a single frangible L-shaped measurement member 30 extend substantially perpendicular to the plane of the aperture without the need for a flexible portion 31, to provide for conduit support portion 32 functionality as described above.

As previously described, after installation of the dryer exhaust conduit and the enclosure 17, a flexible hose can then be inserted directly into the exhaust conduit. The aperture 28 can also be adapted to receive an adaptor piece which can engage with one or both of the exhaust conduit or the flexible hose.

In some arrangements, the wall outlet box 10 may include an integrally formed mounting lip 25 which can be located in a plane substantially parallel to the plane defined by front periphery 18. The mounting lip 25 can include mounting structures, such as holes 37, which can secure the wall outlet box 10 to a wall. In some arrangements, the wall outlet box 10 is attached to at least one wall stud in a stud wall. The top surface 22 and the left and right opposing side surfaces 21*a* and 21*b* can flare outwardly from the back surface 20 to the front periphery 18. Thus, in some arrangements, the wall outlet box 10 can have a substantially tapered shape. This tapered shape advantageously allows stacking of multiple units of the wall outlet box 10, thereby providing an efficient and space-saving means of storing and shipping one or more wall outlet boxes 10.

In other arrangements, the wall outlet box 10 may include a shoulder 26 extending generally outwardly from the front periphery 18. The shoulder 26 can be adjacent and contiguous to the top surface 22 and the opposing side surfaces 21*a* and 21*b*. The shoulder 26 may have a width equal to or greater than the depth of the wall to which the wall outlet box 10 will be attached. In some arrangements, the shoulder 26 may extends outwardly a sufficient distance so as to be substantially in alignment with the surface of the baseboard of a finished wall surface. It is understood, however, that the invention is not limited in this regard. After a wall surface is attached to a stud wall, such as a dry wall surface, the shoulder 26 can abut the edges of the wall surface.

The wall outlet box 10 can also include a front base rim portion 24 which is adjacent and contiguous to the bottom surface 23 and the shoulder 26. The front base portion 24 can extend substantially vertically downward from the front periphery 18. When the wall outlet box 10 is installed in a stud wall, the bottom surface 23 preferably rests on the bottom plate of the stud wall. The vertical height of the front base rim 24 can be approximately equal to the vertical height of bottom plate of the stud wall so the front base rim 24 extends to the floor surface. In the installed configuration, the baseboards of the finished wall surface preferably abut the front base rim 24. The front base rim 24 can be in flush alignment with the front surface of the baseboards to provide a continuous planar surface. The above-described configuration of the front base rim 24 can eliminates the need to notch out the upper portion of the baseboard when the wall outlet box 10 is installed into a wall.

Figure 6:
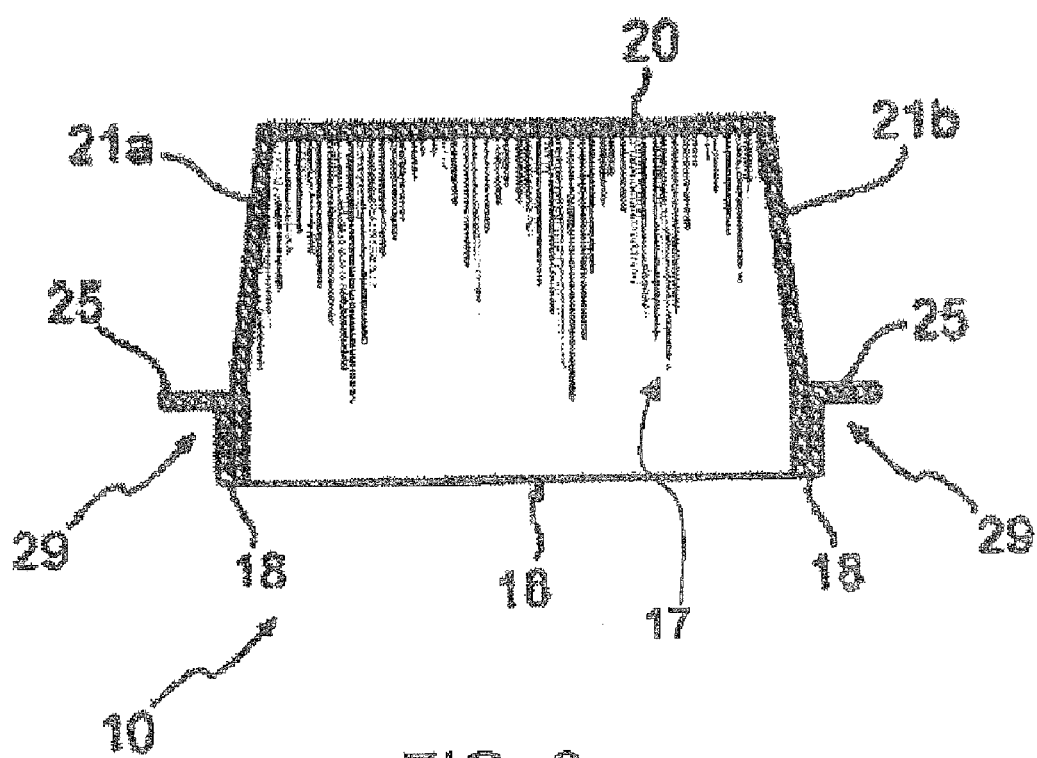
FIG. 6 is a cross-sectional view of the arrangement shown in FIGS. 1a-d taken along the line 6-6 in FIG. 1b.

In some arrangements, the above-described arrangement and function of the mounting lip 25 and shoulder 26 are provided by an L-shaped bracket 29. The configuration of L-shaped bracket 29 can be seen most clearly in the cross-sectional view shown in FIG. 6. The L-shaped bracket 29 can be adjacent to and integrally formed with the top surface 22 and the opposing side surfaces 21*a* and 21*b*. The L-shaped bracket 29 can have a first section that is generally perpendicular to the plane defined by the front periphery 18 and extends toward the rear surface 20, and a second section that can be parallel to the plane defined by the front periphery 18 and extends outwardly from the enclosure 17.

Figure 3A:
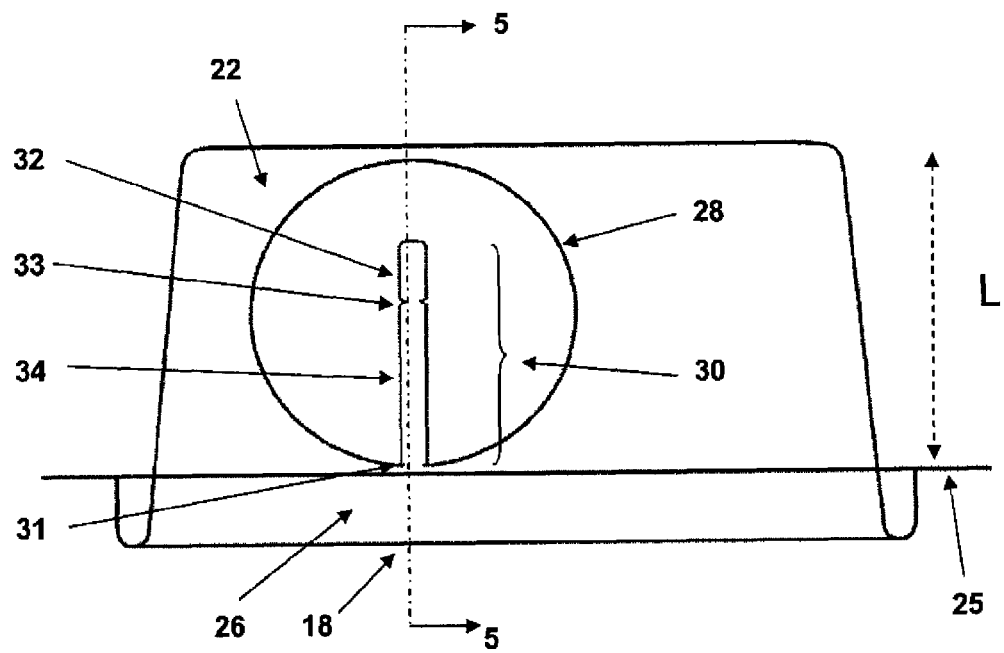
FIG. 3a is a close-up view of the aperture of the arrangement shown in FIGS. 1a-d with an exemplary aperture shape for use with the arrangement shown in FIGS. 1a-d.
Figure 3B:
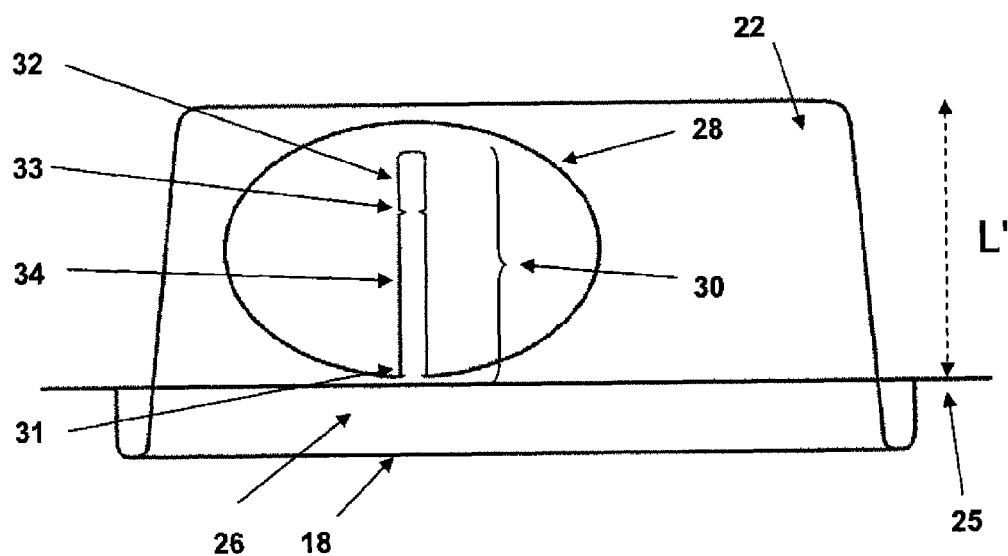
FIG. 3b is a close-up view of the aperture of the arrangement shown in FIGS. 1a-d with another exemplary aperture shape for use with the arrangement shown in FIGS. 1a-d.

As previously indicated, the depth of the wall outlet box 10, as represented by the distance between the back surface 20 and the mounting lip 25, should preferably not exceed the depth of a stud in the wall in which the wall outlet box 10 is to be installed. The depth of wall outlet box 10 may be approximately equal to the depth of the wall stud, typically 4 to 6 inches, so as to maximize the size of the enclosure 17. In the various arrangements, as the depth of the outlet box is reduced from a depth L to L', as shown in FIGS. 3*a* and 3*b*, the shape of the aperture 28 may also be altered to accommodate the same size of dryer exhaust conduit. In the arrangement shown in FIG. 3*b*, the shape of the aperture 28 is altered from a circular opening as shown in FIG. 3*a* to an elliptical opening as shown in FIG. 3*b*. Such an arrangement also still allows adequate storage area for a flexible hose. Therefore the combination of the depth of the wall outlet box 10 and the width of the wall outlet box 10, between opposing side surfaces 21*a* and 21*b*, can be adapted to accommodate an exhaust conduit of any size, even with varying wall stud depth, including those which are between three and six inches in diameter.

In operation, in arrangements with a non-circular shape for the aperture 28, the installation essentially proceeds as previously described. In general, dryer exhaust conduit and flexible dryer hose are constructed from materials and by methods that allow an installer to easily deform their cross-sectional shapes. For example, the wall of dryer exhaust hose and flexible dryer hose are generally constructed using thin metal or plastic. Therefore, in arrangements where the aperture 28 is non-circular and the shape and size of the dryer exhaust conduit does not allow the dryer exhaust conduit to be directly inserted into the aperture 28, an additional step of deforming the end of the dryer exhaust conduit prior to insertion into the aperture 28 would be required. Additionally, deforming the end of flexible hose being attached to the dryer exhaust conduit may also be required to complete installation.

In the various arrangements, the wall outlet box 10 can be dimensioned to allow installation between studs in a stud wall. In a typical stud wall, the distance between studs is approximately 14.5 or approximately 22.5 inches, but greater or lesser widths are also acceptable in conjunction with the present invention. In practice, the distance between the studs in a stud wall can be adjusted at the time of construction to accommodate the installation of wall outlet box 10.

Figure 7:
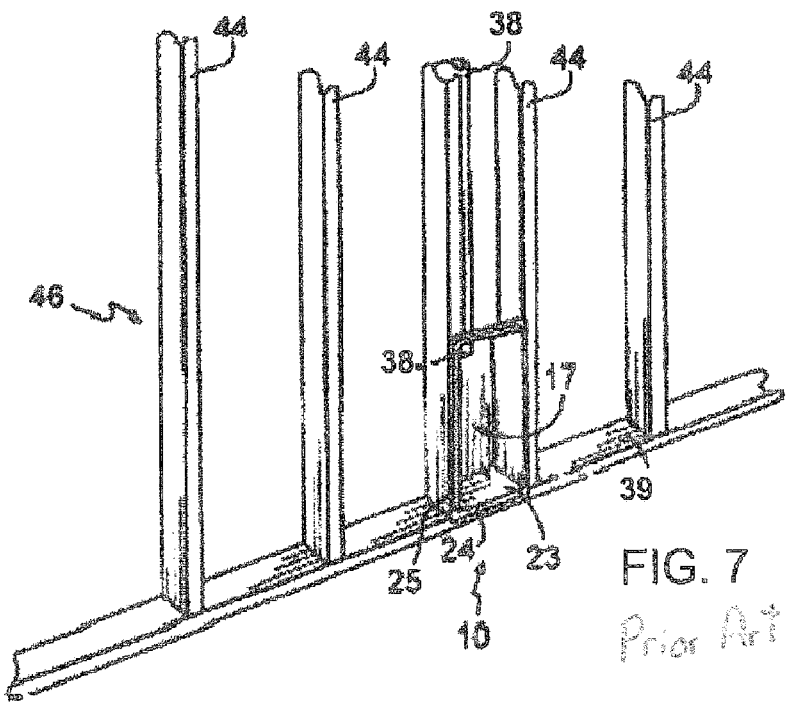
FIG. 7 is a perspective view of the arrangement shown in FIG. 1a installed in a stud wall.

FIG. 7 illustrates an arrangement of the wall outlet box 10 installed in a stud wall 46 prior to the 20 installation of a finished wall surface. The wall outlet box 10 can be secured between two substantially adjacent and vertical wall studs 44. The wall outlet box 10 is preferably attached by aligning the mounting lip 25 with the forward facing surfaces of the wall studs 44, and secured using mounting screws inserted into the holes 37. The exhaust conduit can extend through the aperture 28 (not shown) and into the enclosure 17. The forward edge of bottom surface 23 preferably rests on the top surface of the bottom plate 39 of the stud wall 46. The front base rim label 24 is preferably aligned with the front surface of the bottom plate 39. In the installed configuration, the front base rim 24 can be parallel to the underlying floor surface, and may be approximately flush with the underlying floor surface.

Figure 8:
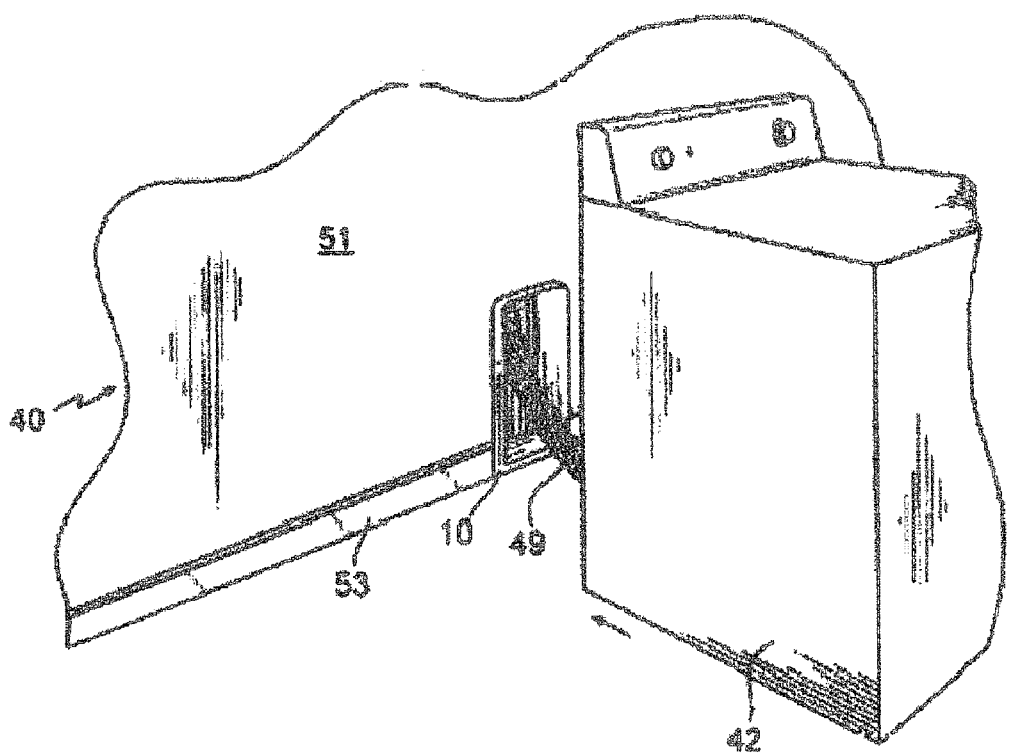
FIG. 8 is a perspective view of the arrangement shown in FIG. 1a installed in a finished wall, with a flexible hose partially installed therein.
Figure 9:
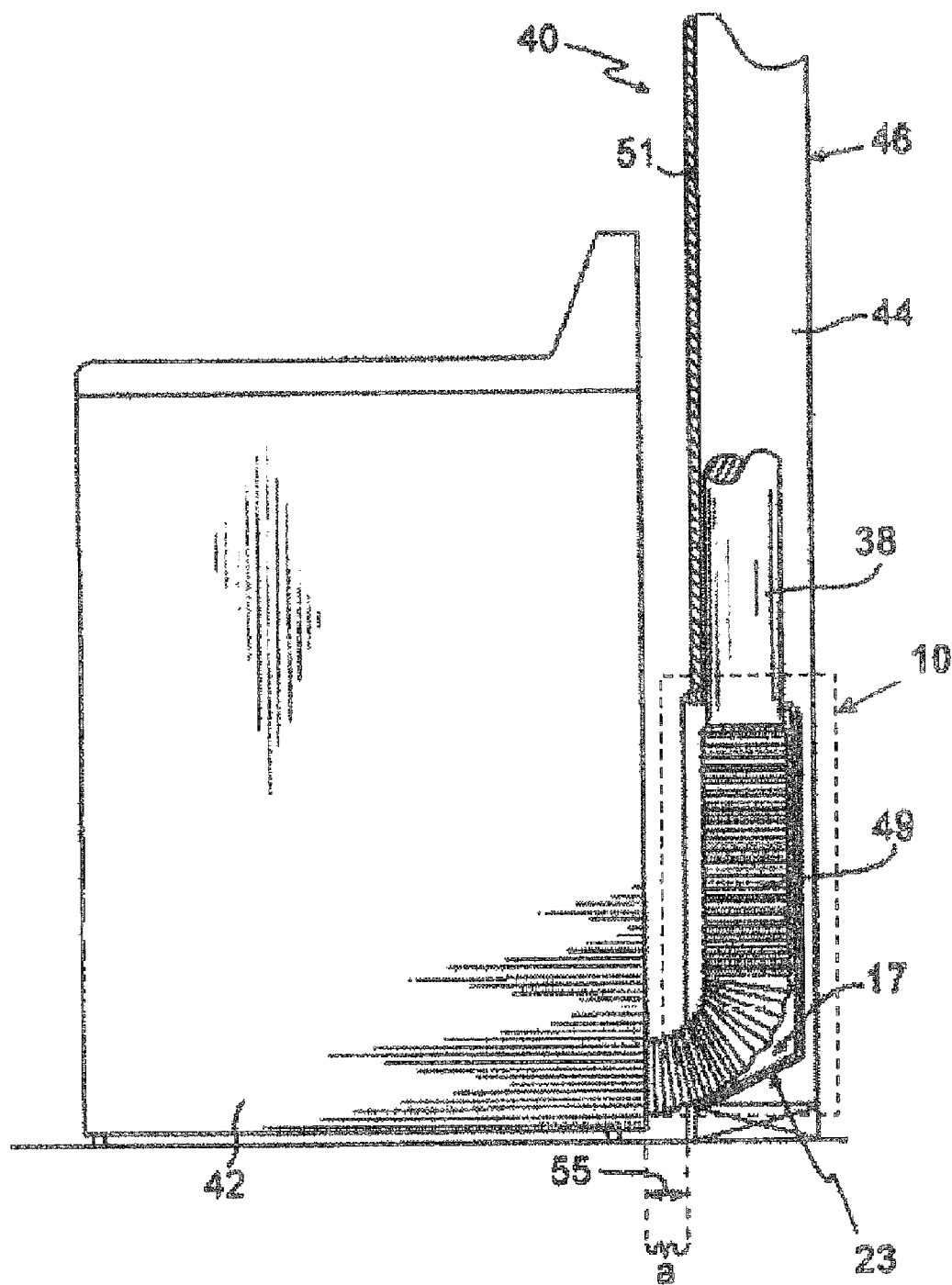
FIG. 9 is a partial cross-sectional view of an arrangement of the invention in an installed configuration.

In FIG. 8, a finished wall 40 includes a wall surface 51 (for example, drywall) and a baseboard 53 which have been installed on the stud wall 46. The edges of the wall surface 51 and baseboard 53 can be substantially adjacent to the wall outlet box 10 and configured to flushly align with the shoulder 26. FIG. 8 further illustrates a dryer 42 having a flexible dryer hose 49 in a partially installed configuration. During installation, the dryer hose 49 can be inserted into the dryer exhaust conduit, after which the dryer 42 can be moved toward the wall outlet box 10. As shown in FIG. 9, an inclined angle of the bottom surface 23 can serve to guide the dryer hose 49 upwardly into the dryer exhaust conduit when the dryer 42 is pushed towards the wall. The wall outlet box 10 can thus advantageously guide the dryer hose 49 into the dryer exhaust conduit when the dryer 42 is pushed toward the wall with significantly reduced kinking, bending, or otherwise altering or damaging of the dryer hose 49. It can also be seen that the dryer 42 can advantageously be placed in relatively close proximity to the wall 40. The practice of the present invention allows the distance 55 between the wall 40 and the dryer 42, represented by a, to be negligible.

Figure 10:
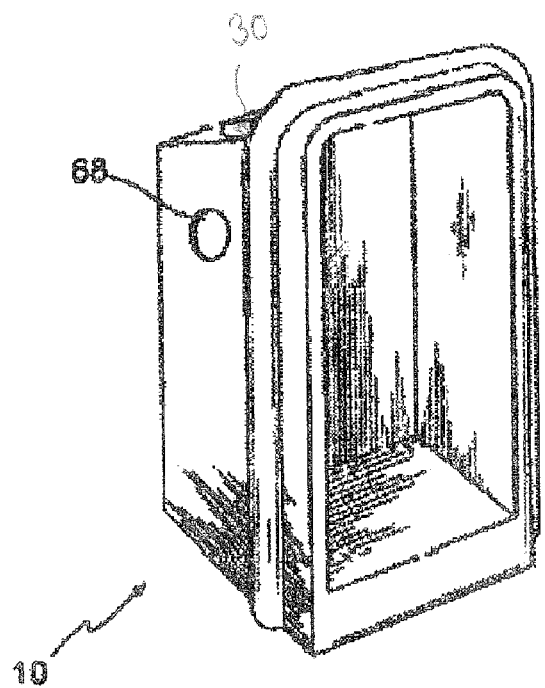
FIG. 10 is a perspective view of another arrangement of the invention which includes a port to receive a gas line.
Figure 11:
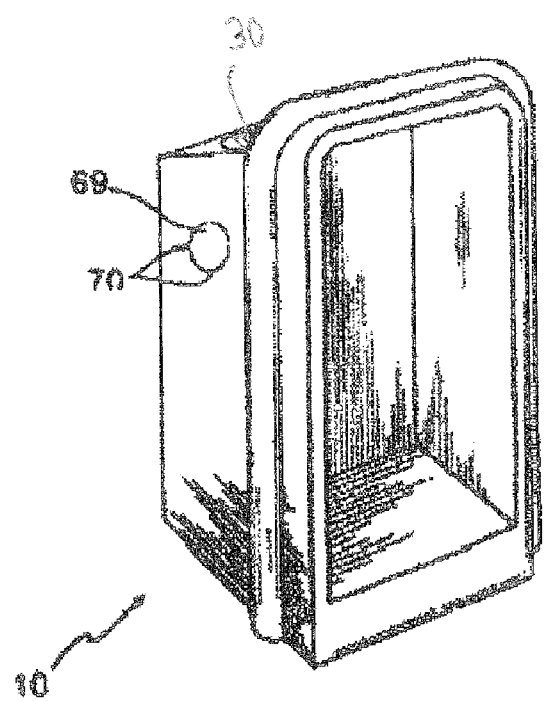
FIG. 11 is a perspective view of the arrangement in which the port is sealed with a knockout portion.

FIG. 10 illustrates additional features of the wall outlet box according to various arrangements of the present invention. In particular, the wall outlet box 10 can include an additional aperture 68 adapted to receive a gas line. As shown in FIG. 11, the aperture 68 can include a knockout portion 69 which preferably initially forms an impervious integral part of the enclosure, and can be attached to the enclosure by a plurality of frangible connector webs 70. The knockout portion 69 can be removed from the wall outlet box by rupturing the frangible connector webs 70 in order to provide the aperture 68 when the knockout portion 69 is removed. The exemplary embodiments of FIGS. 1 to 11 are described with respect to attachment to a dryer exhaust conduit. However, the present disclosure contemplates the use of wall outlet box and its features with other types of conduits.

The present invention can be constructed from a variety of materials. For safety considerations, some arrangements of the present invention may be constructed of materials which are substantially non-flammable and high thermal stability. Suitable materials include metal, fiberglass, ceramic materials, and plastics having the appropriate properties, although other materials are also acceptable. An arrangement of the present invention can be formed as an integral piece using conventional injection molding techniques known in the art, although the invention is not limited in that regard. For example, the present invention can also be constructed from flat stock sheet metal using sheet metal tools.

The invention is capable of taking a number of specific forms without departing from the spirit or essential attributes thereof. Accordingly, the following claims should be referenced to determine the scope of the invention, rather than the foregoing specification.

What is claimed is:

1. A wall outlet box, comprising:
    a plurality of walls defining an enclosure open at a front thereof, said enclosure including a back surface, a pair of opposing side surfaces, a top surface, and a bottom surface, wherein said opposing side surfaces, said bottom surface and said top surface have forward facing edges defining a front periphery;
    a mounting lip extending outwardly from at least a portion of said front periphery for mounting said wall outlet box into a wall;
    at least one port in at least one of said opposing side surfaces, said back surface and said top surface to engage with an exhaust conduit, whereby a flexible hose can be securely attached to a protruding portion of the exhaust conduit and at least a portion of the flexible hose can be housed in said enclosure; and
    at least one measurement member extending across a portion of said at least one port such that the exhaust conduit may be placed against said at least one measurement member as a template prior to installation and cutting of the exhaust conduit and the outlet box, wherein the measurement member comprises first and second flexible portions, wherein the first flexible portion is adapted to be rotated in a downward direction in a plane perpendicular to a plane of said at least one port, wherein the second flexible portion is adapted to be rotated in an upward direction in a plane parallel to the plane of said at least one port thereby defining a protruding lip, wherein the first and second flexible portions when rotated define a conduit support portion having an L-shape and being adapted to support the exhaust conduit.

2. The wall outlet box of claim 1, wherein said mounting lip is configured to allow said wall outlet box to be mounted to at least one vertical wall stud in a stud wall.

3. The wall outlet box of claim 1, wherein said top surface, said bottom surface, and said opposing side surfaces flare outwardly from said back surface to said front periphery.

4. The wall outlet box of claim 1, wherein said bottom surface is adapted to guide the flexible hose towards the exhaust conduit.

5. The wall outlet box of claim 4, wherein said back surface and said bottom surface are curved such that at least a portion of said back surface and said bottom surface comprise a substantially continuous surface.

6. The wall outlet box of claim 1, wherein the at least one measurement member is frangibly removable from the at least one port.

7. The wall outlet box of claim 1, wherein the wall outlet box is constructed from heat resistant materials selected from the group consisting of metal alloys, fiberglass, ceramic materials, and plastic materials.

8. A wall outlet box, comprising:
- a plurality of walls defining an enclosure open at a front thereof, the enclosure having a front periphery;
- a mounting lip extending outwardly from at least a portion of said front periphery for mounting said wall outlet box into a wall;
- at least one port in at one of the plurality of walls to engage with an exhaust conduit, whereby a flexible hose can be securely attached to a protruding portion of the exhaust conduit and at least a portion of the flexible hose can be housed in said enclosure; and
- at least one measurement member extending across a portion of said at least one port such that the exhaust conduit may be placed against said at least one measurement member as a template prior to installation and cutting of the exhaust conduit and the outlet box, wherein the measurement member comprises first and second flexible portions that are adapted for rotation into an L-shape having a protruding lip, wherein the L-shape defines a conduit support portion adapted to support the exhaust conduit.

9. The wall outlet box of claim 8, wherein the first flexible portion is adapted to be rotated in a downward direction in a plane perpendicular to a plane of said at least one port.

10. The wall outlet box of claim 8, wherein the second flexible portion is adapted to be rotated in an upward direction in a plane parallel to the plane of said at least one port thereby defining the protruding lip.

11. The wall outlet box of claim 8, wherein said enclosure includes a back surface, a pair of opposing side surfaces, a top surface, and a bottom surface, wherein said opposing side surfaces, said bottom surface and said top surface have forward facing edges defining the front periphery.

12. The wall outlet box of claim 8, wherein the plurality of walls comprise a bottom surface adapted to guide the flexible hose towards the exhaust conduit.

13. The wall outlet box of claim 11, wherein said back surface and said bottom surface are curved such that at least a portion of said back surface and said bottom surface comprise a substantially continuous surface.

14. The wall outlet box of claim 8, wherein the at least one measurement member is frangibly removable from the at least one port.

\* \* \* \* \*